(12) United States Patent
Bishev et al.

(10) Patent No.: US 12,131,451 B2
(45) Date of Patent: Oct. 29, 2024

(54) SYSTEMS FOR SPATIALLY COHERENT UV PACKING

(71) Applicant: Adobe Inc., San Jose, CA (US)

(72) Inventors: Artem Bishev, Clermont-Ferrand (FR); Jean-François El Hajjar, Clermont-Ferrand (FR)

(73) Assignee: Adobe Inc., San Jose, CA (US)

( * ) Notice: Subject to any disclaimer, the term of this patent is extended or adjusted under 35 U.S.C. 154(b) by 364 days.

(21) Appl. No.: 17/872,595

(22) Filed: Jul. 25, 2022

(65) Prior Publication Data

US 2024/0029221 A1 Jan. 25, 2024

(51) Int. Cl.
*G06T 17/20* (2006.01)
*G06T 3/00* (2024.01)
(Continued)

(52) U.S. Cl.
CPC .............. *G06T 7/00* (2013.01); *G06T 3/00* (2013.01); *G06T 3/02* (2024.01); *G06T 3/14* (2024.01); *G06T 3/147* (2024.01); *G06T 7/70* (2017.01); *G06T 17/00* (2013.01); *G06T 17/20* (2013.01); *G06T 17/205* (2013.01); *G06T 19/00* (2013.01); *G06T 19/20* (2013.01); *G06T 1/60* (2013.01);
(Continued)

(58) Field of Classification Search
CPC ....... G06T 19/20; G06T 17/20; G06T 17/205; G06T 17/00; G06T 7/12; G06T 7/70; G06T 2219/2004; G06T 2219/2008; G06T 2219/2016; G06T 2219/2021; G06T 2219/016; G06T 7/62; G06T 7/13; G06T 7/246; G06T 19/00; G06T 2200/24; G06T 2207/20221; G06T 2207/20212; G06T 7/10; G06T 19/006; G06T 2207/20164; G06T 1/60; G06T 2219/021; G06T 2219/008; G06T 2207/20021; G06T 3/00; G06T 3/02; G06T 3/20; G06T 3/18; G06T 3/147; G06T 3/14; G06T 3/067; G06T 3/06; G06T 3/073; G06V 10/44; G06V 10/457; G06V 10/16
See application file for complete search history.

(56) References Cited

PUBLICATIONS

Maggiordomo et al., Texture Defragmentation for Photo-Reconstructed 3D Models, Jun. 4, 2021 [retrieved Sep. 15, 2024], Computer Graphics Forum, vol. 40, Issue 2, pp. 65-78. Retrival link: https://doi.org/10.1111/cgf.142615 (Year: 2021).*

(Continued)

*Primary Examiner* — Matthew C Bella
*Assistant Examiner* — Dennis Rosario
(74) *Attorney, Agent, or Firm* — FIG. 1 Patents

(57) ABSTRACT

In implementations of systems for spatially coherent UV packing, a computing device implements a packing system to identify pairs of boundary vertices of different two-dimensional islands included in a set of two-dimensional islands. A first boundary vertex and a second boundary vertex of the pairs of boundary vertices both correspond to a same three-dimensional coordinate of a three-dimensional mesh. The packing system determines transformations for two-dimensional islands included in the set of two-dimensional islands based on distances between the first boundary vertex and the second boundary vertex of the pairs of boundary vertices. A three-dimensional object is generated for display in a user interface based on the transformations and the three-dimensional mesh.

20 Claims, 8 Drawing Sheets

(51) Int. Cl.

| | | |
|---|---|---|
| *G06T 3/02* | (2024.01) | |
| *G06T 3/14* | (2024.01) | |
| *G06T 3/147* | (2024.01) | |
| *G06T 7/00* | (2017.01) | |
| *G06T 7/70* | (2017.01) | |
| *G06T 17/00* | (2006.01) | |
| *G06T 19/00* | (2011.01) | |
| *G06T 19/20* | (2011.01) | |
| *G06T 1/60* | (2006.01) | |
| *G06T 3/06* | (2024.01) | |
| *G06T 3/067* | (2024.01) | |
| *G06T 7/10* | (2017.01) | |

(52) U.S. Cl.
CPC ............... *G06T 3/06* (2024.01); *G06T 3/067* (2024.01); *G06T 7/10* (2017.01); *G06T 2200/24* (2013.01); *G06T 2207/20021* (2013.01); *G06T 2207/20164* (2013.01); *G06T 2219/021* (2013.01); *G06T 2219/2004* (2013.01); *G06T 2219/2016* (2013.01)

(56) References Cited

PUBLICATIONS

Teixeira, Artistic Style Transfer for Textured 3D Models [thesis], 2017 [retrieved Sep. 15, 2024], Faculdade De Engenharia Da Universidade Do Porto, 97 pages. Retrieved: https://www.proquest.com/dissertations-theses/artistic-style-transfer-textured-3d-models/docview/2925389042/se-2?accountid=147533 (Year: 2017).*

Agarwal, Pankaj K, et al., "Polygon decomposition for efficient construction of Minkowski sums", Computational Geometry, vol. 21 [retrieved Apr. 12, 2022]. Retrieved from the Internet <https://users.cs.duke.edu/~pankaj/publications/papers/poly-mink.pdf>., Jan. 2002, 23 Pages.

Bennell, Julia , et al., "The geometry of nesting problems: A tutorial", European Journal of Operational Research, vol. 184, No. 2 [retrieved Apr. 12, 2022]. Retrieved from the Internet <http://vmk.ugatu.ac.ru/c%26p/article/new/nesting_problems_tutorialEJOR-184-2008.pdf>., Nov. 15, 2006, 19 Pages.

Burrus, Sidney , "Iterative Reweighted Least Squares", Openstax CNX [retrieved Apr. 12, 2022]. Retrieved from the Internet <https://cnx.org/contents/krkDdys0@12/Iterative-Reweighted-Least-Squares>., 2018, 11 Pages.

Cherri, Luiz Henrique , et al., "An innovative data structure to handle the geometry of nesting problems", International Journal of Production Research [retrieved Apr. 12, 2022]. Retrieved from the Internet <https://repositorio.unesp.br/bitstream/handle/11449/170477/2-s2.0-85038405876.pdf?sequence=1&isAllowed=y>., Dec. 18, 2017, 19 Pages.

Elkeran, Ahmed , "A new approach for sheet nesting problem using guided cuckoo search and pairwise clustering", European Journal of Operational Research, vol. 231, No. 3 [retrieved Apr. 12, 2022]. Retrieved from the Internet <https://www.researchgate.net/publication/270725215_A_new_approach_for_sheet_nesting_problem_using_guided_cuckoo_search_and_pairwise_clustering>., Dec. 16, 2013, 14 Pages.

Hu, Yannan , et al., "Efficient overlap detection and construction algorithms for the bitmap shape packing problem", Journal of the Operations Research Society of Japan [retrieved Apr. 12, 2022]. Retrieved from the Internet <http://www.orsj.or.jp/~archive/pdf/e_mag/Vol.61_01_132.pdf?1606435200062>., Jan. 2018, 19 Pages.

Jiang, Weiwei , et al., "A two-dimensional nesting algorithm by using no-fit polygon", IEEE 7th Annual Information Technology, Electronics and Mobile Communication Conference (IEMCON) [retrieved Aug. 10, 2022]. Retrieved from the Internet <10.1109/IEMCON.2016.7746344>., 2016, 5 Pages.

Levy, Bruno , et al., "Least Squares Conformal Maps for Automatic Texture Atlas Generation", Proceedings of the 29th annual conference on Computer graphics and interactive techniques [retrieved Apr. 12, 2022]. Retrieved from the Internet <http://citeseerx.ist.psu.edu/viewdoc/download?doi=10.1.1.396.814&rep=rep1&type=pdf>., Jul. 2002, 10 pages.

Li, Zhenyu , et al., "Compaction and separation algorithms for non-convex polygons and their applications", European Journal of Operations Research [retrieved Apr. 12, 2022]. Retrieved from the Internet <http://citeseerx.ist.psu.edu/viewdoc/download?doi=10.1.1.50.6230&rep=rep1&type=pdf>., 1995, 25 Pages.

Li, Minchen , et al., "OptCuts: joint optimization of surface cuts and parameterization", ACM Transactions on Graphics, vol. 37 No. 6 [retrieved Apr. 12, 2022]. Retrieved from the Internet <http://www.vovakim.com/papers/18_SIGGRAPHAsia_OptCuts.pdf>., Dec. 4, 2018, 13 Pages.

Lien, Jyh-Ming , et al., "Approximate convex decomposition of polygons", SCG '04: Proceedings of the twentieth annual symposium on Computational geometry [retrieved Apr. 12, 2022]. Retrieved from the Internet <https://cs.gmu.edu/~jmlien/research/app-cd/cd2d_CGTA.pdf>., Jun. 8, 2004, 24 Pages.

Limper, Max , et al., "Box cutter: Atlas refinement for efficient packing via void elimination", ACM Transactions on Graphics, vol. 37 No. 4 [retrieved Apr. 12, 2022]. Retrieved from the Internet <http://www.cs.ubc.ca/labs/imager/tr/2018/BoxCutter/Limper2018_BoxCutter_LowRes.pdf>., Jul. 30, 2018, 13 Pages.

Nöll, T , et al., "Efficient Packing of Arbitrary Shaped Charts for Automatic Texture Atlas Generation", Eurographics conference on Rendering [retrieved Apr. 12, 2022]. Retrieved from the Internet <https://github.com/russellklenk/libmega/blob/master/docs/Efficient%20Packing%20of%20Arbitrary%20Shaped%20Charts%20for%20Automatic%20Texture%20Atlas%20Generation.pdf>., Jul. 19, 2011, 9 Pages.

Odaker, Thomas , et al., "Texture analysis and repacking for improved storage efficiency", Proceedings of the 22nd ACM Conference on Virtual Reality Software and Technology [retrieved Aug. 10, 2022]. Retrieved from the Internet <https://doi.org/10.1145/2993369.2996332>., Nov. 2, 2016, 2 Pages.

Rousseeuw, Peter J, "Least Median of Squares Regression", Journal of the American Statistical Association, vol. 79, No. 388 [retrieved Apr. 12, 2022]. Retrieved from the Internet <https://wis.kuleuven.be/stat/robust/papers/publications-1984/rousseeuw-leastmediansquaresregression-jasa-1984.pdf>., Dec. 1984, 10 pages.

Sharp, Nicholas , et al., "Variational surface cutting", ACM Transactions on Graphics vol. 37 No. 4 [retrieved Apr. 12, 2022]. Retrieved from the Internet <https://web.archive.org/web/20190603191727id_/http://www.cs.cmu.edu/~kmcrane/Projects/VariationalCuts/paper.pdf>., Jul. 30, 2018, 13 Pages.

Sheffer, Alla , et al., "Seamster: Inconspicuous Low-Distortion Texture Seam Layout", Proceedings of the conference on Visualization '02 [retrieved Apr. 12, 2022]. Retrieved from the Internet <https://web.archive.org/web/20050516115559id_/http://graphics.cs.uiuc.edu:80/~jch/papers/seamster.pdf>., Oct. 2002, 8 pages.

Smith, Jason , "Bijective parameterization with free boundaries", ACM Transactions on Graphics, vol. 34 No. 4 [retrieved Apr. 12, 2022]. Retrieved from the Internet <https://oaktrust.library.tamu.edu/handle/1969.1/156497>., Jul. 27, 2015, 85 Pages.

Tang, Danhang , et al., "Deep Implicit vol. Compression", IEEE/CVF Conference on Computer Vision and Pattern Recognition (CVPR) [retrieved Apr. 12, 2022]. Retrieved from the Internet <https://3dvar.com/Tang2020Deep.pdf>., May 18, 2020, 14 Pages.

* cited by examiner

500 

502
Identify pairs of boundary vertices of different two-dimensional islands included in a set of two-dimensional islands, a first boundary vertex and a second boundary vertex of the pairs of boundary vertices both correspond to a same three-dimensional coordinate of a three-dimensional mesh

504
Determine transformations for two-dimensional islands included in the set of two-dimensional islands based on distances between the first boundary vertex and the second boundary vertex of the pairs of boundary vertices

506
Generate a three-dimensional object for display in a user interface based on the transformations and the three-dimensional mesh

*Fig. 5*

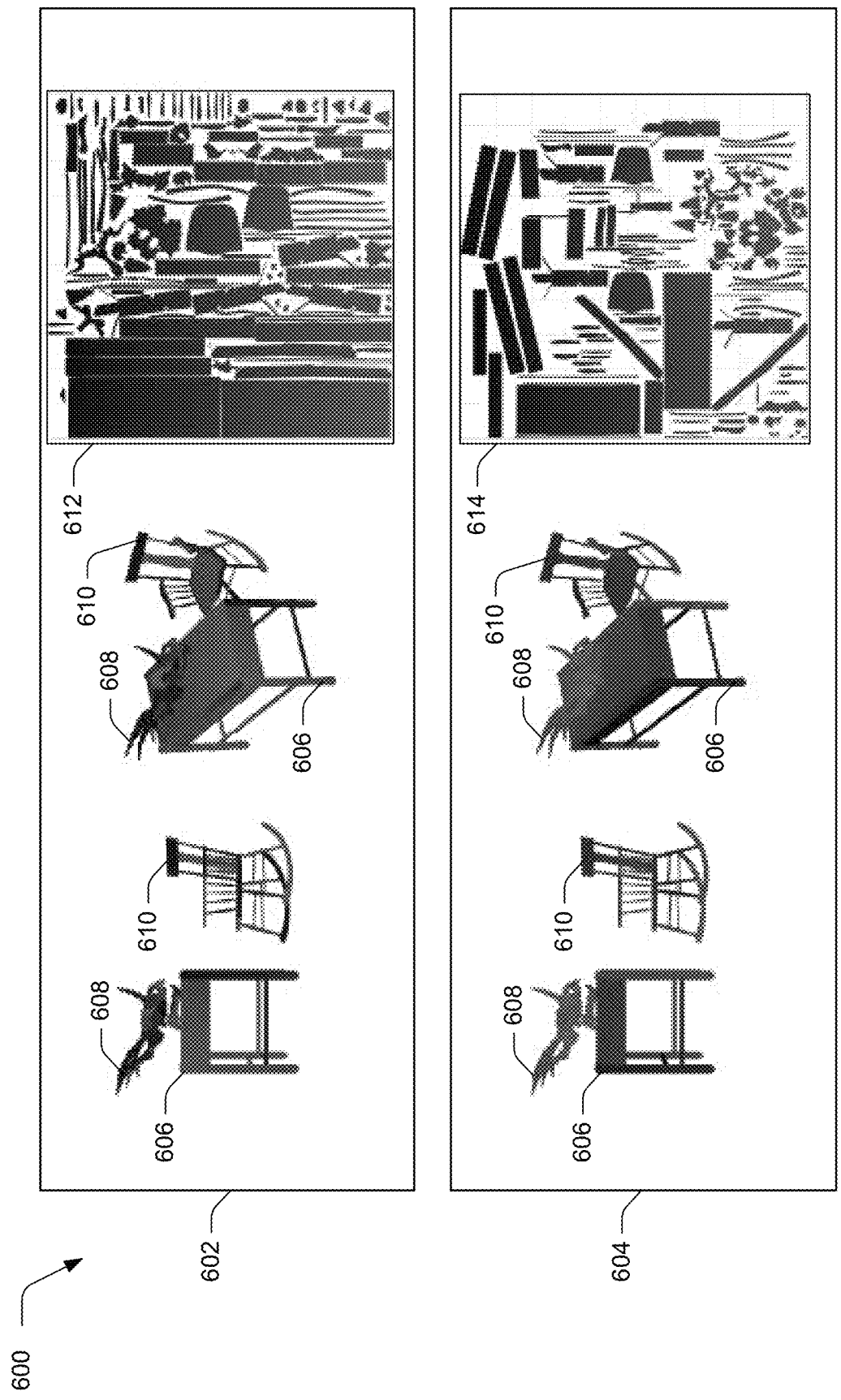

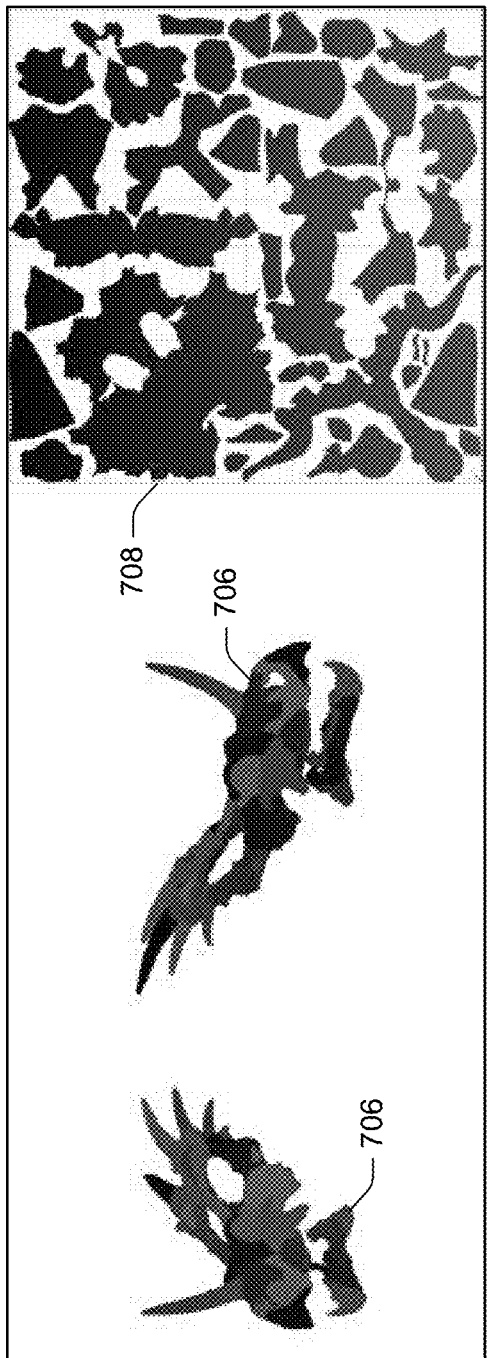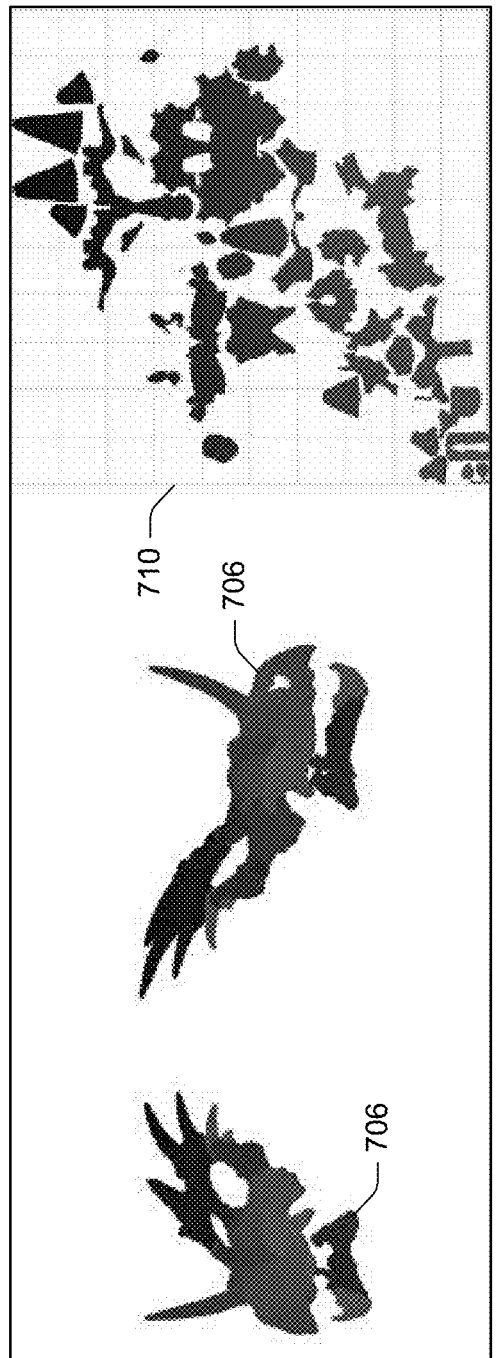
Fig. 7

SYSTEMS FOR SPATIALLY COHERENT UV PACKING

BACKGROUND

Texture mapping is a rendering technique that leverages mappings between a three-dimensional mesh and a two-dimensional texture to generate a three-dimensional object having a geometry defined by the mesh and an appearance defined by the texture. The mappings typically associate vertices of the mesh with two-dimensional coordinates called UVs. In content creation and authoring applications, the UVs are commonly generated by automatic UV unwrapping which is generally a three-stage process.

In a first stage of the automatic UV unwrapping, the mesh is seamed or segmented into smaller portions called charts. Next, in a second stage, the charts are parameterized (i.e., flattened) into two-dimensional islands. In the last stage, the two-dimensional islands are transformed (e.g., rotated and/or translated) in order to be packed into a rectangular bin without overlapping. The two-dimensional islands are arranged in the rectangular bin based on an objective, e.g., to optimize a fill ratio for the bin so that an amount of unused space in the rectangular bin is minimized.

SUMMARY

Techniques and systems for spatially coherent UV packing are described. In one example, a computing device implements a packing system to identify pairs of boundary vertices of different two-dimensional islands included in a set of two-dimensional islands. A first boundary vertex and a second boundary vertex of the pairs of boundary vertices both correspond to a same three-dimensional coordinate of a three-dimensional mesh.

For example, the packing system determines transformations for two-dimensional islands included in the set of two-dimensional islands based on distances between the first boundary vertex and the second boundary vertex of the pairs of boundary vertices. In an example, the packing system determines the transformations such that the distances are minimized. For instance, a three-dimensional object is generated for display in a user interface based on the transformations and the three-dimensional mesh.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 5 is a flow diagram depicting a procedure in an example implementation in which a three-dimensional object is generated for display in a user interface based on a three-dimensional mesh and transformations for two-dimensional islands included in a set of two-dimensional islands.

FIG. 6 illustrates a representation of a first example of automatic packing that optimizes a fill ratio compared to spatially coherent UV packing.

FIG. 7 illustrates a representation of a second example of automatic packing that optimizes a fill ratio compared to spatially coherent UV packing.

DETAILED DESCRIPTION

Overview

Figure 1:
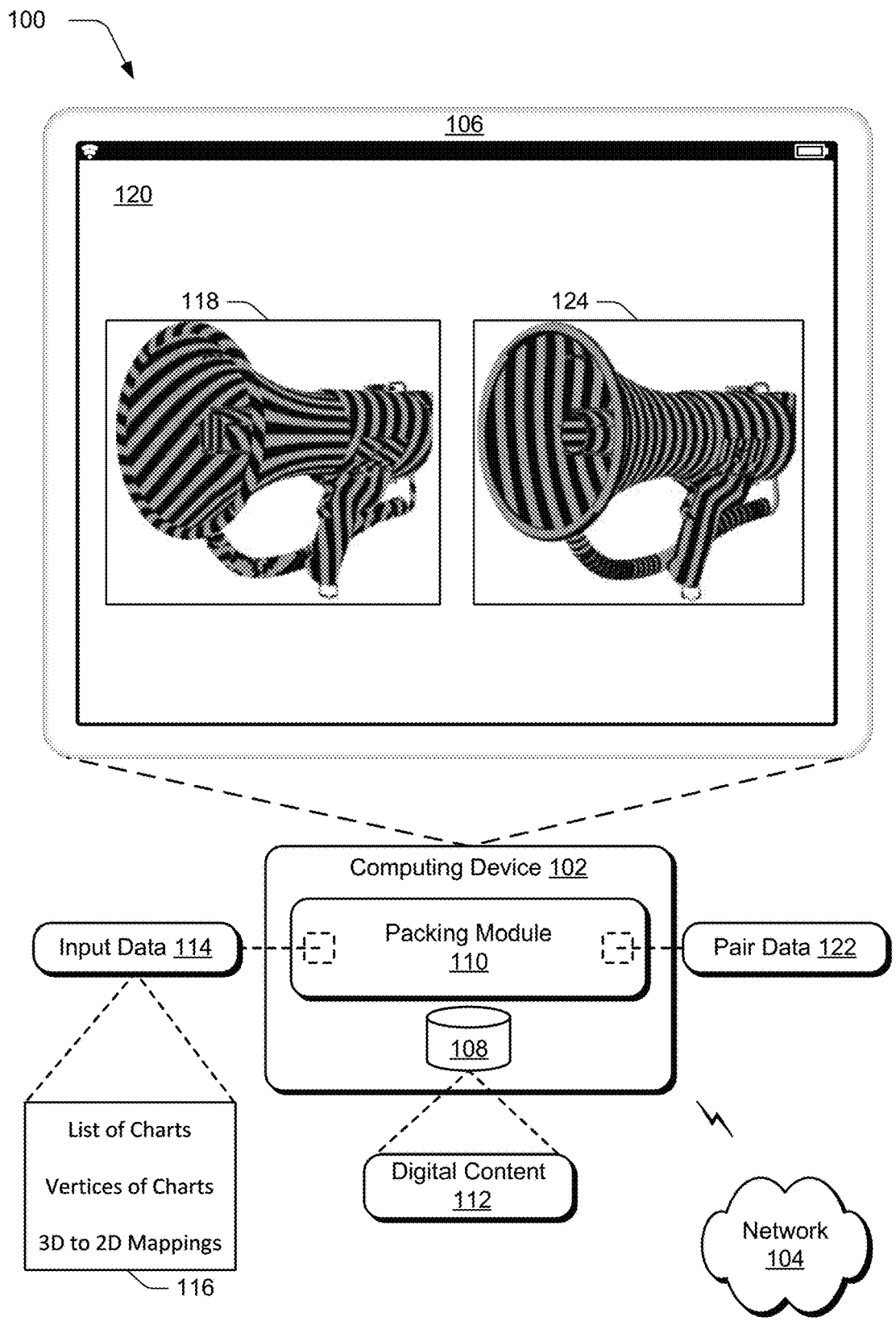
FIG. 1 is an illustration of an environment in an example implementation that is operable to employ digital systems and techniques for spatially coherent UV packing as described herein.

In content creation and authoring applications such as applications for three-dimensional painting, UVs are frequently generated by automatic UV unwrapping. In an initial stage of the automatic UV unwrapping, a three-dimensional mesh is seamed or segmented into smaller portions called charts. Next, the charts are parameterized (i.e., flattened) into two-dimensional islands. In a final stage of the automatic UV unwrapping, the two-dimensional islands are transformed in order to be packed into a rectangular bin without overlapping. In conventional systems, the two-dimensional islands are arranged in the rectangular bin to optimize a fill ratio for the bin such that an amount of unused space in the rectangular bin is minimized.

However, because the conventional systems arrange the two-dimensional islands in the rectangular bin in this manner, it is possible for boundary vertices of the two-dimensional islands having a same corresponding three-dimensional coordinate of the three-dimensional mesh to be separated by a relatively large distance in the rectangular bin. For instance, the three-dimensional coordinate belongs to multiple charts as part of a seam introduced when the three-dimensional mesh is seamed in the initial stage of the automatic UV unwrapping. The relatively large distance in the rectangular bin between the boundary vertices having the same corresponding three-dimensional coordinate results in an undesirable discontinuity that increases an incidence of spatially incoherent read and write operations which cause cache misses.

In order to overcome the limitations of conventional systems, techniques and systems for spatially coherent UV packing are described. In an example, a computing device implements a packing system to receive input data describing outputs of intermediate stages of automatic UV unwrapping that precede a packing stage. In another example, the packing system receives the input data as describing a three-dimensional mesh and a two-dimensional texture, and the packing system performs automatic UV unwrapping by seaming the three-dimensional mesh into charts and flattening the charts into two-dimensional islands.

In either example, the packing system processes the input data to identify two-dimensional islands that are "connected" because each of the two-dimensional islands has a boundary vertex that maps to a same three-dimensional coordinate of the original (non-segmented) three-dimensional mesh. For example, after identifying all of the two-dimensional islands that are "connected" in this manner, the packing system determines transformations for the two-dimensional islands such that Euclidian distances between connected islands are minimized. In this example, by minimizing the Euclidian distance between connected two-dimensional islands, the packing system arranges the islands in a two-dimensional layout that reflects relative positions of their corresponding charts in the three-dimensional mesh.

To do so in one example, the packing system determines that a Euclidian distance between a pair of connected vertices in a final UV layout depends on unknown transformations of respective two-dimensional islands having the connected vertices. The packing system uses this dependency to define an objective function in terms of unknown transformations of the two-dimensional islands. For example, the packing system then determines rotations and translations for the unknown transformations that minimize the objective function which minimizes the Euclidian distances between the connected two-dimensional islands. Although distances between the connected two-dimensional islands are described as being Euclidian distances in this example, it is to be appreciated that in other examples, the distances minimized between the connected two-dimensional islands are Hamming distances, Manhattan distances, Minkowski distances, and so forth.

The packing system determines rotations for the two-dimensional islands such that all of the two-dimensional islands are oriented coherently with each other along with the orientation of their original three-dimensional charts. In one example, the packing system determines the rotations for the two-dimensional islands to match a vector of a canonical coordinate system that defines a natural mesh orientation as closely as possible. In this example, the packing system determines the rotations for the two-dimensional islands to match a vector defined as v=(0,0,1); v=(0,1,0); or v=(1,0,0).

After determining the rotations for the two-dimensional islands, the packing system fixes the rotations so that the rotations are excluded from later optimization stages in some examples. Fixing the rotations in these examples causes the objective function to be convex with respect to translations of the two-dimensional islands. For instance, fixing the rotations also allows the packing system to precompute acceleration structures for querying penetration distances between pairs of the two-dimensional islands which are reusable during the later optimization stages.

For example, the packing system determines initial translations for the two-dimensional islands that minimize the objective function but allow the islands to overlap. In one example, the packing system determines the initial translations using iteratively reweighted least squares, and then trims or discards resulting connections that are longer than a threshold (e.g., a user defined threshold). After discarding these connections, the packing system executes the iteratively reweighted least squares with fewer connections which enables the packing system to resolve overlaps of the two-dimensional islands.

After the packing system determines the rotations and the initial translations, the two-dimensional islands are included in clusters. In an example, each cluster contains a two-dimensional island or multiple two-dimensional islands that are connected. In this example, it is possible for connected two-dimensional islands included in the clusters to be overlapping. To resolve these overlaps, the packing system computes an approximate No-Fit Polygon for the two-dimensional islands included in the clusters. In one example, the packing system considers convex hulls of island boundaries instead of the island boundaries themselves which allows for complex non-overlap constraints for the islands to be replaced with a linear equation based on a separating line between convex hulls of the island boundaries.

Continuing the previous example, by considering the convex hulls instead of the boundaries of the islands, all feasible relative positions of pairs of two-dimensional islands are replaced by a half-plane determined by a tangent line of the convex hull of the corresponding No-Fit Polygon. For instance, this set of constraints has at least one feasible point which is solvable in polynomial time using a quadratic program. In an example, the corresponding solution results in one or multiple clusters of two-dimensional islands.

For example, the islands in each cluster are packed according to a spatially coherent packing objective that minimizes the Euclidian distance (or another distance) between boundary vertices of connected islands that map to a same three-dimensional coordinate. The packing system packs the clusters in a rectangular bin by treating each cluster as an island and freezing rotations and relative transformations of the islands within each cluster. In an example, the packing systems leverages the concept of No-Fit Polygons to greedily place the clusters in the rectangular bin such that an amount of unused space in the rectangular bin is minimized. For instance, resulting transformations of clusters composed with local transformations of islands within each cluster define a UV layout for texture mapping.

By generating the UV layout using spatially coherent UV packing in this manner, three-dimensional objects are rendered with a reduced incidence of spatially incoherent read and write operations compared to conventional systems that generate UV layouts by packing islands in a bin such that an amount of unused space in the bin is minimized. For example, reducing an incidence of the spatially incoherent write operations also reduces a number of cache misses relative to the conventional systems. This improvement is particularly significant in scenarios in which a user interacts directly with a two-dimensional view of the UV layout such as in three-dimensional painting applications. In these scenarios, a brush stroke is less likely to span multiple distant memory regions simultaneously if the UV layout is generated using spatially coherent UV packing which in turn results in a smoother and more intuitive workflow for users (e.g., digital artists) relative to UV layouts generated using conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a packing module 110. The storage device 108 is illustrated to include digital content 112 such as digital images, digital videos, graphic artwork, etc.

The packing module 110 is illustrated as having, receiving, and/or transmitting input data 114. For example, the input data 114 describes outputs 116 of automatic UV unwrapping stages that precede a packing stage in a rendering pipeline. In some examples, the packing module 110 receives the input data 114 as describing the outputs 116 of automatic UV unwrapping stages that precede the packing stage. In other examples, the packing module 110 is capable of generating the input data 114 as describing the outputs 116 of automatic UV unwrapping stages that precede the packing stage.

Consider an example in which the packing module 110 receives a three-dimensional mesh of a megaphone and a two-dimensional texture with vertical stripes, and the computing device 102 implements the packing module 110 to assign or map the two-dimensional texture to the three-dimensional mesh. To do so in one example, the packing module 110 performs automatic UV unwrapping which is typically a three-stage process of seaming the three-dimensional mesh, parameterizing charts, and packing islands into a rectangular bin. For example, the packing module 110 seams the three-dimensional mesh by cutting the mesh along some of its edges to segment the three-dimensional mesh into smaller portions referred to as charts.

After seaming the mesh, the packing module 110 identifies a list of all of the charts which are each described by a list of vertices and a list of edges. In order to generate the input data 114, the packing module 110 parameterizes each of the charts by computing a mapping between three-dimensional vertices of each the charts and associated two-dimensional coordinates (e.g., of the two-dimensional texture with vertical stripes). By parameterizing each of the charts in this way, the packing module 110 generates flattened charts referred to as islands or two-dimensional islands. The packing module 110 then generates the input data 114 as describing the outputs 116 of automatic UV unwrapping stages that precede the packing stage. As shown, the packing module 110 generates input data 114 as describing the list of charts, the vertices of the charts, and the three-dimensional to two-dimensional mappings. For example, the packing module 110 also generates the input data 114 as describing a list of island shapes that are each defined by a sequence of two-dimensional boundary vertices.

Consider an example in which the packing module 110 receives the input data 114 as describing the outputs 116 of automatic UV unwrapping stages that precede the packing stage. In this example, the computing device 102 generates the input data 114. For instance, the computing device 102 leverages the input data 114 to complete the automatic UV unwrapping by packing each of the two-dimensional islands into the rectangular bin such that the islands do not overlap and an amount of unused area in the rectangular bin is minimized.

In one example, the computing device 102 computes transformations such as rotations and translations for the two-dimensional islands in order to arrange the islands in the rectangular bin by optimizing a fill ratio for the rectangular bin such that an amount of unused area in the bin is minimized. In this example, the computing device 102 uses the arrangement of two-dimensional islands in the rectangular bin that optimizes the fill ratio, the three-dimensional mesh of the megaphone, and the two-dimensional texture with vertical stripes to generate a three-dimensional object 118 which is displayed in a user interface 120 of the display device 106. For example, the computing device 102 generates the three-dimensional object 118 using texture mapping based on the arrangement of two-dimensional islands in the rectangular bin. Since the computing device 102 rotates the two-dimensional islands to generate the arrangement as minimizing the amount of unused area in the rectangular bin, the two-dimensional islands have a variety of different rotations in the arrangement. As a result, the vertical stripes of the two-dimensional texture are oriented in different directions in the three-dimensional object 118 corresponding to the different rotations of the two-dimensional islands in the arrangement of the islands in the rectangular bin.

Returning to the examples in which the packing module 110 generates or receives the input data 114 as describing the outputs 116 of automatic UV unwrapping stages that precede the packing stage. In these examples, the packing module 110 leverages the input data 114 to complete the automatic UV unwrapping by packing each of the two-dimensional islands into the rectangular bin. To do so in one example, the packing module 110 processes the input data 114 to identify connections between the charts in which a pair of boundary vertices from different charts belong to a seam and thus share a same three-dimensional coordinate of the three-dimensional mesh.

As used herein, two-dimensional vertices of different two-dimensional islands are "connected" if the two-dimensional vertices correspond to a same three-dimensional coordinate of the original (non-segmented) three-dimensional mesh of the megaphone. The packing module 110 processes the input data 114 to generate a list of all of the connected two-dimensional islands, and this list includes indices of the connected islands (or charts) and the respective two-dimensional island vertices. For example, the packing module 110 generates pair data 122 describing the list of all of the connected two-dimensional islands.

Consider an example in which the packing module 110 leverages the pair data 122 to pack each of the two-dimensional islands into the rectangular bin in a manner which minimizes distances between pairs of connected vertices of the two-dimensional islands. In this example, the packing module 110 determines that a Euclidean distance (or a "connection length") between a pair of connected two-dimensional vertices in a final two-dimensional arrangement in the rectangular bin depends on unknown transformations (e.g., rotations and translations) of respective two-dimensional islands. The packing module 110 determines transformations for the two-dimensional islands such that Euclidean distances or connection lengths between connected vertices of the two-dimensional islands are minimized.

For example, the packing module 110 defines an objective function based on the Euclidian distance between a connected pair of two-dimensional vertices and then determines a rotation to apply to the two-dimensional islands. In this example, the packing module 110 rotates each of the two-dimensional islands to align with a vector of the canonical coordinate system such as (1,0,0), (0,1,0), or (0,0,1). This rotation is fixed which simplifies computation of an optimal solution for the objective function. For instance, with the rotation of the islands fixed, the objective function is solvable using efficient numerical methods to minimize connection lengths between connected vertices of the two-dimensional islands. After rotating the two-dimensional islands in this manner, orientations of all the islands are coherent with each other along with their original three-dimensional charts.

The packing module 110 then optimizes the objective function, e.g., using iteratively reweighted least squares, to determine initial translations for the two-dimensional islands which allow the islands to overlap in the rectangular bin. For example, the packing module 110 determines the initial translations for the islands by iteratively solving systems of equations. After determining the initial translations for the two-dimensional islands, the packing module 110 trims the systems of equations. In one example, the packing module 110 discards connections between two-dimensional vertices that have connection lengths greater than a threshold connection length. In this example, the packing module 110 then uses iteratively reweighted least squares with fewer connections to simplify the task of resolving overlapping islands.

After trimming the connections that are greater than the threshold connection length, the two-dimensional islands are included in clusters. For example, each cluster includes a single two-dimensional island or multiple two-dimensional islands that are connected. Since it is possible for two-dimensional islands included in the clusters to be overlapping, the packing module 110 resolves these overlaps by computing an approximate No-Fit Polygon for each pair of islands in the clusters using approximate convex decomposition. For instance, the packing module 110 then determines a union of convex No-Fit Polygons.

Because the rotations of the islands are fixed, the packing module 110 uses precomputed No-Fit Polygons for resolving the overlaps in the clusters. However, this results in a set of constraints which is not convex. In one example, the packing module 110 overcomes this by using convex hulls of the island boundaries instead of using the island boundaries. After replacing the island boundaries with their corresponding convex hulls, the set of constraints is solvable in polynomial time. In an example, the packing module 110 does not apply this method directly but instead modifies the method to handle concave islands which improves the described spatially coherent packing objective as well as the object that minimizes the amount of unused space in the rectangular bin.

Finally, the packing module 110 packs the clusters into the rectangular bin. The islands included in each cluster are packed in accordance with the spatially coherent packing objective. The packing module 110 treats each cluster as an island with the rotations and relative transformations of islands inside each cluster fixed. In an example, the packing module 110 leverages the concept of No-Fit Polygons to greedily place the clusters one-by-one in the quadrant x>0, y>0. In this example, each cluster is placed so that it does not overlap any of the already placed islands and so that the maximum of all x and y coordinates of it is minimized.

The packing module 110 uses the spatially coherent arrangement of clusters of two-dimensional islands in the rectangular bin, the three-dimensional mesh of the megaphone, and the two-dimensional texture with vertical stripes to generate a three-dimensional object 124 which is also displayed in the user interface 120. Since the two-dimensional islands have spatially coherent rotations in the rectangular bin, the vertical stripes of the two-dimensional texture remain nearly vertical in the three-dimensional object 124. This results in an improved visual appearance of the three-dimensional object 124 relative to the three-dimensional object 118 and also a reduction in spatially incoherent read and write operations which generally result in cache misses. Accordingly, the described systems for spatially coherent UV packing demonstrate multiple improvements relative to conventional techniques for packing two-dimensional islands in a rectangular bin.

Figure 2:
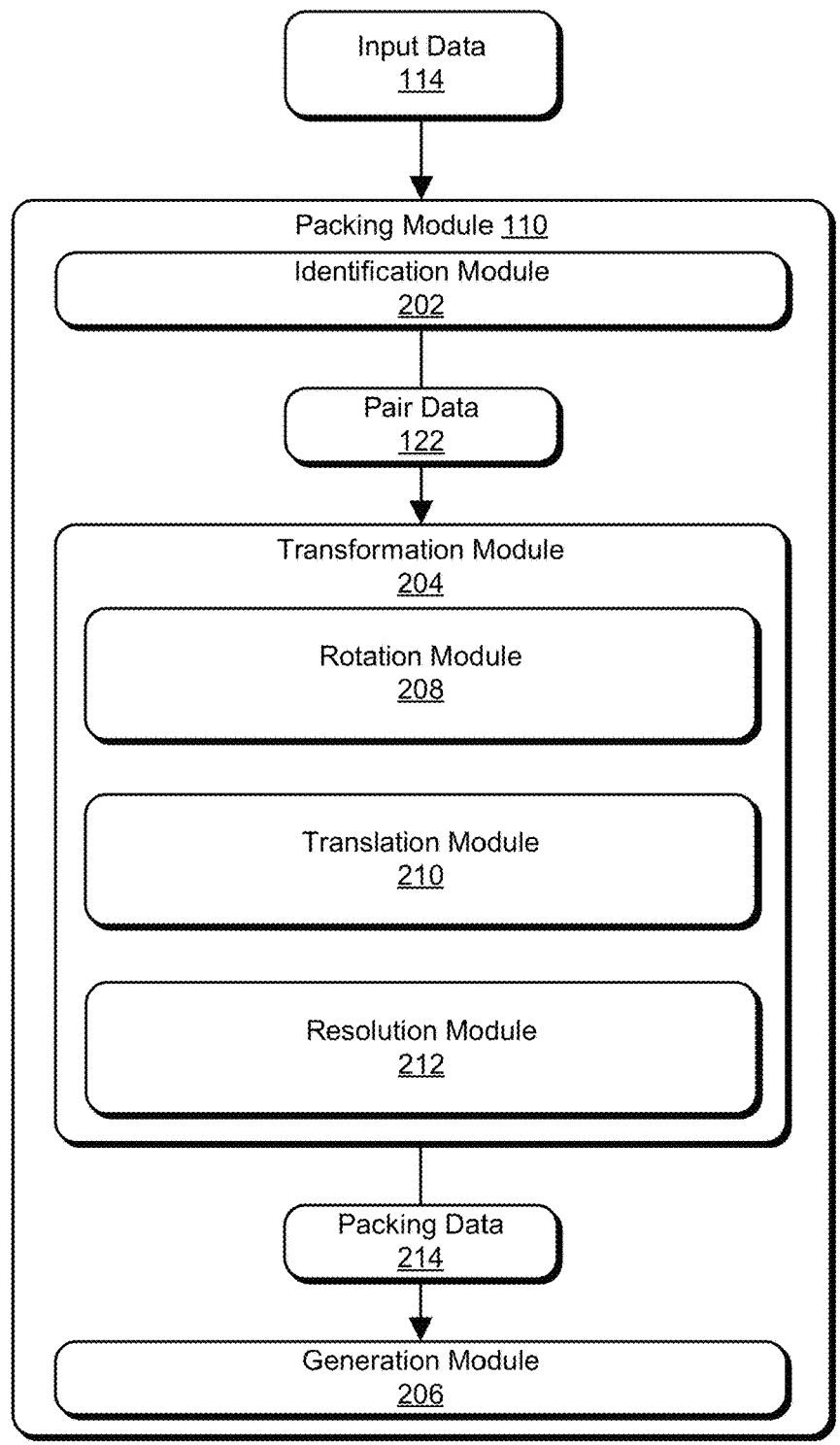
FIG. 2 depicts a system in an example implementation showing operation of a packing module for spatially coherent UV packing.

FIG. 2 depicts a system 200 in an example implementation showing operation of a packing module 110. The packing module 110 is illustrated to include an identification module 202, a transformation module 204, and a generation module 206. For instance, the transformation module 204 is illustrated as including a rotation module 208, a translation module 210, and a resolution module 212. As shown, the identification module 202 receives and processes the input data 114 to generate pair data 122.

In one example, the input data 114 describes outputs from automatic UV unwrapping stages that precede a packing stage. In this example, the input data 114 describes a list of charts $C=\{C_1, C_2, \ldots, C_n\}$. For example, each chart $C_i$ is described by a list of vertices $V_i=\{v_{i1}, v_{i2} \ldots \}$, $v_{ij} \in \mathbb{R}^3$, and a list of edges $E_i$. In addition to describing each chart $C_i$, the input data 114 describes a three-dimensional to two-dimensional mapping $P_i: \mathbb{R}^3 \to \mathbb{R}^2$ that is a result of the preceding parameterization step after seaming a three-dimensional mesh into the charts $C_i$. Thus, the input data 114 describes two-dimensional images of charts $C_i$ with $P_i$ applied to vertices of the two-dimensional images which are referred to as islands.

In another example, the input data 114 describes a three-dimensional mesh and a two-dimensional texture. In this example, the packing module 110 receives the input data 114 and implements the stages of automatic UV unwrapping that precede the packing stage. To do so in one example, the packing module 110 seams the three-dimensional mesh into the charts $C_i$. The packing module 110 then parameterizes each of the charts $C_i$ and computes the three-dimensional to two-dimensional mapping $P_i: \mathbb{R}^3 \to \mathbb{R}^2$ that flattens the charts $C_i$ into two-dimensional islands.

The identification module 202 receives the input data 114 and processes the input data 114 to identify connections between the charts $C_i$ that appear when a pair of boundary vertices of the vertices $V_i$ from different ones of the charts $C_i$ belong to seam and thus share the same three-dimensional coordinates: $v_{pi}=v_{qj}$, $p \neq q$. The identification module 202 defines two-dimensional vertices of different two-dimensional islands as being "connected" if the two-dimensional vertices share a same three-dimensional coordinate of the original, non-segmented mesh such that vertices $u_{pi}=P_p(v_{pi})$, $u_{qj}=P_q(v_{qj})$, $p \neq q$ are connected if $v_{pi}=v_{qj}$. For example, the identification module 202 applies a positive weight w to each of the connections which defines an importance for optimizing a length of a particular connection. In one example, the identification module 202 defines the positive weight w as:

$$\frac{1}{2}(a+b)$$

where: a, b are lengths of three-dimensional seam edges that are incident to $v_{pi}=v_{qj}$.

The identification module 202 processes the input data 114 to identify a list of all connections described by the input data 114 which is representable as:

$$L=\{L_1, L_2, \ldots, L_m | L_i=(u'_i, u''_i, k'_i, k''_i, w_i)\}$$

where: $k'_i, k''_i \in \{1,2,\ldots,n\}$ are the indices of connected charts (or islands) and $u'_i, u''_i \in \mathbb{R}^2$ are the respective island vertices, which serves as an input to the packing stage along with the list of island shapes, each defined by a sequence of two-dimensional boundary vertices.

The identification module 202 generates the pair data 122 as describing the list of all the connections L. For example, the transformation module 204 receives and processes the pair data 122 to generate packing data 214. To do so in one example, the transformation module 204 defines an output of the packing stage as an arrangement of the islands in UV space. This includes rotations of the islands (locally around their barycenters or centroids) defined by angles $\Theta=\{\theta_1, \theta_2, \ldots, \theta_n\}$, $\theta_i \in [0, 2\pi)$ and translations (global positions of barycenters or centroids) defined by vectors $T=\{t_1, t_2, \ldots, t_n\}$, $t_i \in \mathbb{R}^2$. The transformation module 204 denotes a rotation matrix for island i as $R(\theta_i)$. Accordingly, a full mapping between a three-dimensional point v that belongs to the i-th chart and its UV coordinate is a two-step process: first, a known parameterization from the chart space to the island space $u=P_i(v)$, and second, an unknown rigid transformation for this island that places it in a specific location in a rectangular bin: $R(\theta_i)u+t_i$.

Given a connection $L_i=(u'_i, u''_i, k'_i, k''_i, w_i)$, a Euclidean distance between a pair of connected vertices in a final two-dimensional layout (called a "connection length") depends on the unknown transformations of the respective islands. If the transformations are known, then the two-dimensional connection length is computable as follows:

$$D(L_i)=\|R(\theta_{k'_i})u'_i - R(\theta_{k''_i})u''_i + t_{k'_i} - t_{k''_i}\|_2$$

Spatially coherent packing determines such rigid transformations for a given set of islands such that the connections stay as minimal as possible in terms of Euclidean distance. In one example, this is achieved by minimizing the following objective function:

$$\sum_{i=1}^{M} w_i \cdot F(D(L_i))$$

where: $F: \mathbb{R} \to \mathbb{R}$; and F is $F(d)=d^p$ with $p<2$.

After defining the objective function, the transformation module 204 accounts for a list of constraints such that different three-dimensional points on the mesh surface are mapped to different two-dimensional points of the final layout. For instance, this assumes that the output of the parameterization step provides an injective mapping (e.g., the islands have no triangle flips with the orientation changed from counterclockwise to clockwise, the islands have no degenerate triangles with zero area, and the islands have no self-overlaps). During the packing phase, the transformation module 204 ensures that transformed islands do not overlap with each other. After accounting for this, the transformation module 204 represents the formulation to solve as:

$$\min_{\Theta, T} \sum_{i=1}^{M} w_i \cdot F(D(L_i))$$

where: $D(L_i)=\|R(\theta_{k'_i})u'_i - R(\theta_{k''_i})u''_i + t_{k'_i} - t_{k''_i}\|_2$
subject to: $\forall i \neq j$: islands i, j do not overlap.

Figure 3:
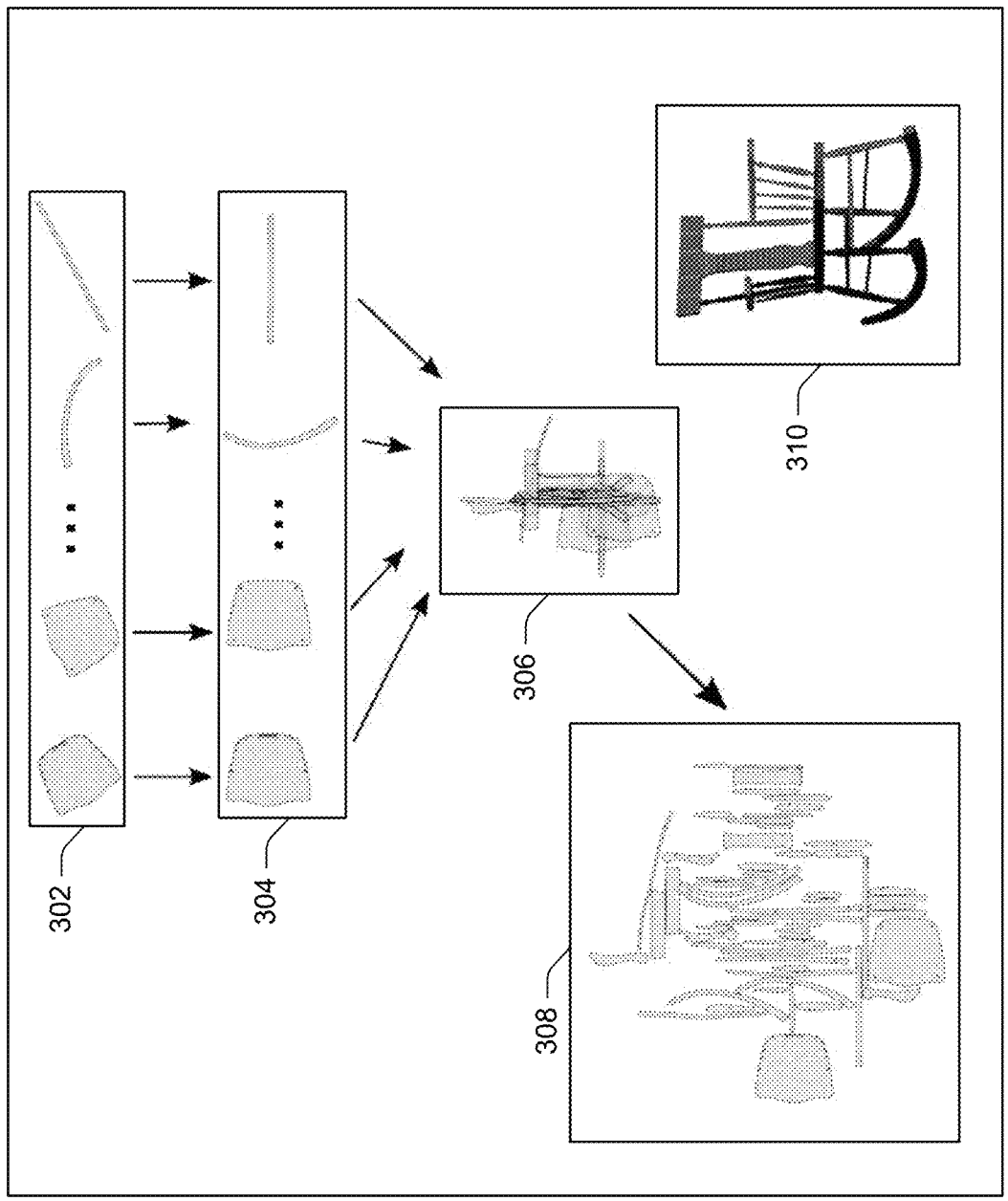
FIG. 3 illustrates a representation of some steps involved in spatially coherent UV packing.

FIG. 3 illustrates a representation 300 of some steps involved in spatially coherent UV packing. The representation 300 includes the islands 302 which are output from the stages of automatic UV unwrapping that precede the packing stage. The transformation module 204 implements the rotation module 208 to determine rotations for the islands 302. For example, the rotation module 208 rotates the two-dimensional islands 302 to align with a vector of the canonical coordinate system such as (1,0,0), (0,1,0), or (0,0,1). The rotation module 208 denotes $\hat{v} \in \mathbb{R}^3$ (by default $\hat{v}=(0,0,1)$) as the vector that defines a natural mesh orientation. In one example, the rotation module 208 estimates a two-dimensional vector $\hat{u} \in \mathbb{R}^2$ that represents a projection of $\hat{v}$ in the island space using the following integral over the surface of chart $C_i$:

$$\hat{u} = \iint_{C_i} <\hat{v}, v> P_i(v) dC_i$$

where: $C_i$ and $P_i(C_i)$ are centered ($\iint_{C_i} v dC_i=0$, $\iint_{C_i} P_i(v) dC_i=0$) otherwise modifications should be made; and the unknown angle $\theta_i$ of island i is an angle between $\hat{u}$ and an "up" vector (0,1). Sometimes $\hat{u}$ is relatively small and $\theta_i$ is not well defined. The rotation module 208 detects this case by checking the following condition with appropriately small $\varepsilon$:

$$\|\hat{u}\| \geq \varepsilon \sqrt{\iint_{C_i} \|v\|_2^2 dC_i \iint_{C_i} \|P_i(v)\|_2^2 dC_i}$$

where: the rotation module 208 evaluates the condition and if the rotation module 208 determines the condition is not fulfilled, then the rotation module 208 orients the island using some other $\hat{v}$ or in accordance with a minimal area bounding box over the two-dimensional island shape.

The rotation module 208 applies the determined rotation to the islands 302 to generate rotated islands 304 which have coherent orientations with each other along with orientations of their original three-dimensional charts. After generating the rotated islands 304, the rotation module 208 fixes the rotation applied to the rotated islands 304 such that the rotation is excluded from later optimization stages. In some examples, fixing the rotation applied to the rotated islands 304 makes F convex and the objective function convex with respect to translations T. For example, in order to prevent the islands from overlapping, the transformation module 204 queries penetration distance between each pair of islands. In this example, fixing the rotation applied to the rotated islands 304 allows the transformation module 204 to pre-compute specific acceleration structures for the queries a single time and then reuse the precomputed acceleration structures throughout the optimization process.

The transformation module 204 implements the translation module 210 to determine translations for the rotated islands 304 based on the objective function such that the determined translations allow the islands to overlap in the rectangular bin. To do so in one example, the translation module 210 reformulates the objective function as minimizing the following:

$$\|A\hat{T}-B\|_F^2$$

where: A, B are known matrices of sizes m×n and m×2, respectively; where n is a number of the islands; m is a number of the connections; and $\hat{T}$ is an unknown n×2 matrix and each row of T is a two-dimensional vector that represents an unknown island translation from T.

In one example, the translation module 210 determines experimentally that solutions which optimize the number of connections that are relatively short and neglect the longest connections are preferable over solutions that try to avoid having very long connections. In order to optimize the objective function with F (d)=$d^p$, the translation module 210 utilizes an iteratively reweighted least squares method. The matrix A∈ $\mathbb{R}^{m \times n}$ is defined by the connections L={$L_1$, $L_2$, ..., $L_m$|$L_i$=($u'_i$, $u''_i$, $k'_i$, $k''_i$, $w_i$)}. In this example, the i-th row of matrix A is defined as follows:

$$\begin{matrix} 1 & \ldots & k'_i & \ldots & k''_i & \ldots & n \end{matrix}$$

$$A_i = [0 \ldots +1 \ldots -1 \ldots 0]$$

Matrix B∈ $\mathbb{R}^{m \times 2}$ is defined as follows:

$$B = \begin{bmatrix} u'_1 \\ u'_2 \\ \vdots \\ u'_m \end{bmatrix}$$

The translation module 210 iteratively solves the following system of normal equations: $A^T W^{(i)} A \hat{T}^{(i)} = A^T W^{(i)} B$. For example, $W^{(i)} \in \mathbb{R}^{m \times m}$ is the diagonal matrix of weights:

$$W^{(i)} = \begin{bmatrix} w_1 \beta_1^{(i)} & 0 & \ldots & 0 \\ 0 & w_2 \beta_2^{(i)} & \ldots & 0 \\ \vdots & \vdots & \ddots & \vdots \\ 0 & \ldots & \ldots & w_m \beta_m^{(i)} \end{bmatrix}$$

Initially, $\beta_i^{(0)} = 1$. After each iteration, the weights are updated in accordance with the residual R=B−A$\hat{T}$ as follows: $\beta_i^{(i)} = \max\{\delta, \|r_i\|\}^{p-2}$ where $\delta > 0$ is a small regularization value and $r_i$ is the i-th row of $R_i$, i.e., a residual that corresponds to the connection $L_i$. At the end of this process in some examples, the translation module 210 trims the system of equations as describe by Rousseeuw, *Least Median of Squares Regression*, J AMER STATIST ASSN 79, pp. 871-880 (December 1984). For example, the translation module 210 discards connections that are longer than a threshold length and re-runs the iteratively reweighted least squares with fewer connections. In an example, the threshold length is a user defined input.

Figure 4:
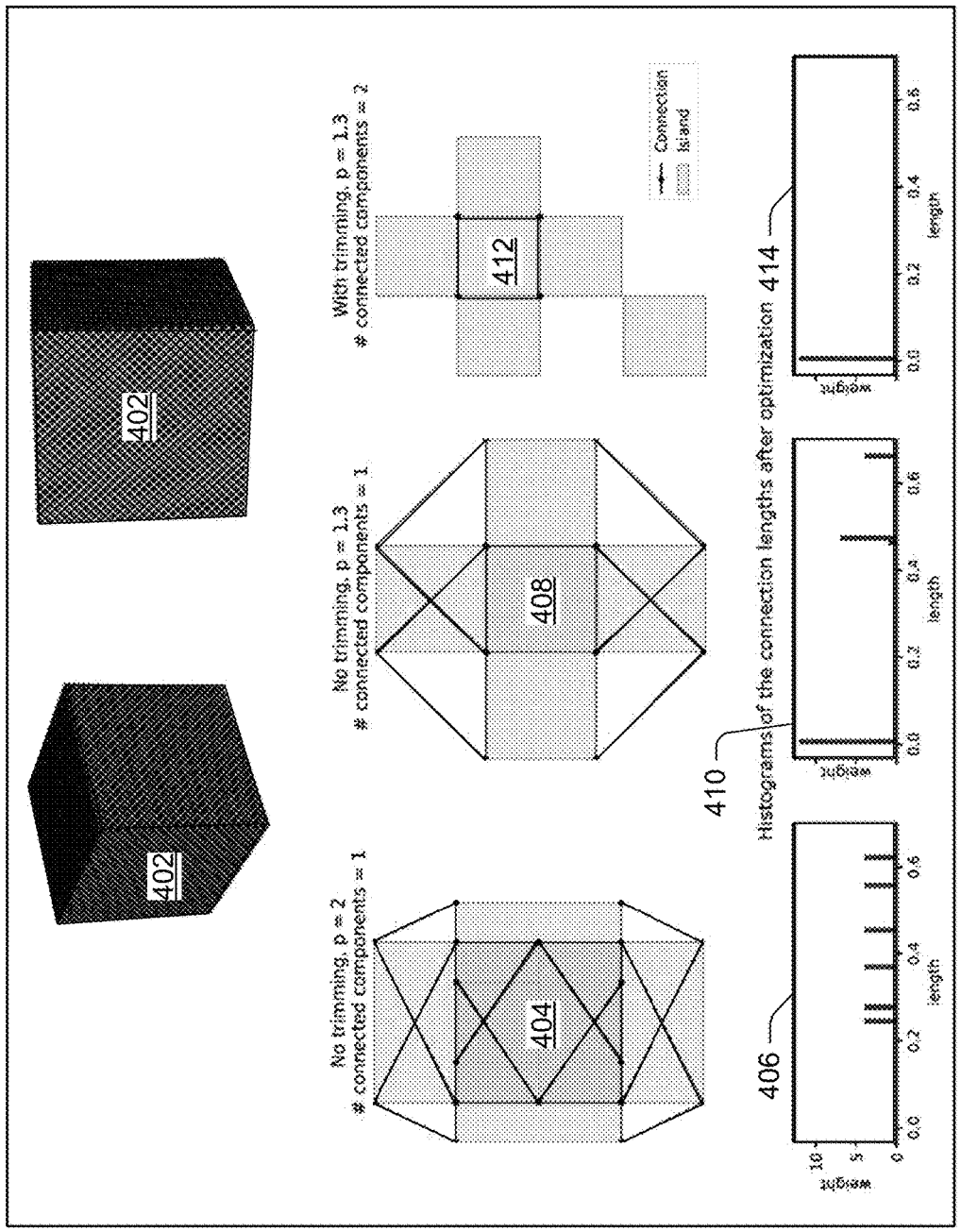
FIG. 4 illustrates a representation of trimming or discarding connections between islands separated by distances greater than a threshold distance.

FIG. 4 illustrates a representation 400 of trimming or discarding connections between islands separated by distances greater than a threshold distance. The representation 400 includes a simple cube 402 with each of side of the cube 402 being a separate chart. In a first example 404, the translation module 210 does not trim any connections and uses a value of p=2. As shown, this results in one connected component having several connections of a relatively large distance or long length which is illustrated in a first histogram 406 of connection lengths after optimization.

In a second example 408, the translation module 210 also does not trim any connections and uses a value of p=1.3 which also results in one connected component. Accordingly, compared to the first example 404 the translation module 210 reduces the value of p in the second example 408. By reducing the value of p, the translation module 210 has significantly shortened the lengths of multiple connections as illustrated in a second histogram 410 of connection lengths after optimization. In a third example 412, the translation module 210 does trim connections and uses a value of p=1.3. As illustrated in the representation 400, trimming the connections in the third example 412 results in two connected components. This also minimizes lengths of the connections such that all of the remaining connections are of a short length which is illustrated in a third histogram 414 of connection lengths after optimization.

After the translation module 210 discards connections that are longer than the threshold length and re-runs the iteratively reweighted least squares with fewer connections, the translation module 210 uses a result of the iteratively reweighted least squares to determine initial translations for the islands 302. The translation module 210 applies the determined initial translations to the rotated islands 304 to generate initially translated islands 306. As shown, islands included in the initially translated islands 306 overlap with other islands included in the initially translated islands 306.

For example, the islands 302 are included in clusters of the initially translated islands 306. As used herein, a "cluster" includes a two-dimensional island or multiple two-dimensional islands that are connected. As outlined above, it is possible for islands to be overlapping in the clusters. Accordingly, the transformation module 204 implements the resolution module 212 to resolve overlaps of islands within the clusters.

In order to query a penetration distance between each pair of polygons and also to determine all feasible relative positions of these polygons, the resolution module 212 uses a No-Fit Polygon concept as described by Bennell et al., *The Geometry of Nesting Problems: A Tutorial*, European Journal of Operational Research 184.2 pp. 397-415 (2008). In an example, a No-Fit Polygon is essentially a Minkowski difference of two polygons. For example, the resolution module 212 computes an approximate No-Fit Polygon for each pair of islands in a cluster using approximate convex decomposition as described by Lein et al., *Approximate Convex Decomposition of Polygons*, Computational Geometry 35.1 pp. 100-123 (September 2005), and then computes a union of the convex No-Fit Polygons as described by Agarwal et al., *Polygon Decomposition for Efficient Construction of Minkowski Sums*, Computational Geometry 21.1 pp. 39-61 (2002).

For instance, because the rotation module 208 fixed the rotations of the rotated islands 304, the resolution module 212 leverages precomputed No-Fit Polygons for the entire overlap resolution phase. For each pair of islands $C_i$, $C_j$, their No-Fit Polygon NFP ($C_i$, $C_j$) is a two-dimensional polygon, possibly with holes and concavities, with inner points defining all relative translations $t_i - t_j$ that lead to overlaps while all points outside of this polygon define all relative transformations that are feasible (do not lead to overlaps). For example, the resolution module 212 reformulates the conditions of the objective function in terms of No-Fit Polygons as:

$$\forall i \neq j: \ t_i - t_j \notin NFP(C_i, C_j)^\circ$$

The resolution module 212 denotes t* as a translation of island i and determines a set of translations $t_1, \ldots, t_n$ that fulfill the reformulated conditions above and stays as close as possible by weighted Euclidean distance to the initial solution $t^*_1, \ldots, t^*_n$ to which is representable as:

$$\min_{t_1, \ldots, t_n} \sum_{i=1}^{n} \pi_i \|t_i - t_i^*\|_2^2$$

subject to: $\forall i \neq j$: $t_i - t_j \notin \text{NFP}(C_i, C_j)$

The resolution module 212 replaces $t_i - t^*_i$ with a single unknown variable $\tau_i$ and transforms the No-Fit Polygons by translating each of them by vector $t^*_j - t^*_j$ to simplify the notation as:

$$\min_{\tau_1, \ldots, \tau_n} \sum_{i=1}^{n} \pi_i \|\tau_i\|_2^2$$

subject to: $\forall i \neq j$: $\tau_i - \tau_j \notin \text{NFP}(C_i, C_j)^\circ$ For example, the resolution module 212 sets each weight $\pi_i$ to the perimeter of the outer boundary of island i. Since the above constraints are not convex, the resolution module 212 defines a convex subset of feasible points in a manner similar to the approach described by Li et al., *Compaction and Separation Algorithms for Non-Convex Polygons and Their Applications*, European Journal of Operational Research 84.3 pp. 539-561 (1995). In an example, the resolution module 212 further simplifies the above constraints by considering the convex hulls of island boundaries instead of the island boundaries themselves. In this example, the resolution module 212 replaces the complex non-overlap constraints for islands i,j with a single linear equation based on the separating line between the convex hulls of their boundaries.

For instance, replacing islands with their convex hulls is equivalent to using the convex hull of the corresponding No-Fit Polygons and the resolution module 212 denotes the boundary of the convex hull of NFP $(C_i, C_j)$ as $\Omega_{ij}$. In an example, this is representable as:

$\forall i \neq j: \sigma_{ij}[\tau_i - \tau_j - \rho_{ij}, \rho_{ij}] > 0$, where:

$$\rho_{ij} = \min_{\rho \in \Omega_{ij}} \|\rho\|_2 \text{ and } \sigma_{ij} = \begin{cases} +1 & \text{if islands } i, j \text{ overlap} \\ -1 & \text{otherwise} \end{cases}$$

As represented above, all feasible relative positions of each pair of islands are replaced by a half-plane determined by the tangent line on the convex hull of the No-Fit Polygon. In this manner, the set of constraints always has at least one feasible point and is therefore solvable in polynomial time with the following Quadratic Program:

$$\min_{\tau_1, \ldots, \tau_n} \sum_{i=1}^{n} \pi_i \|\tau_i\|_2^2$$

subject to: $\forall i \neq j$: $\sigma_{ij}[\tau_i - \tau_j - \rho_{ij}, \rho_{ij}] > 0$ In some examples, the resolution module 212 does not apply the above method directly but rather modifies the above method for concave islands. In these examples, by modifying the method for concave islands, the resolution module 212 significantly improves both the spatially coherent packing objective and the packing objective that minimizes the amount of unused space in the rectangular bin. In another example, instead of using a single linear constraint for a pair of islands that is based a separating line between their convex hulls, the resolution module 212 uses a set of constraints constructed as follows:

---

$S_{ij} \leftarrow \emptyset$
$Q_{ij} \leftarrow$ set of all points of NFP($C_i, C_j$) boundary that strictly satisfy all constraints from $S_{ij}$
while $Q_{ij} \neq \emptyset$ do
 p ← point from $Q_{ij}$ with minimal Euclidean norm
  if p is a concave point of NFP($C_i, C_j$) then
  add two linear constraints formed by incident edges of p
   else
  add linear constraint based on p to $S_{ij}$
   end if
 update $Q_{ij}$ with new $S_{ij}$
  end while

---

The above algorithm is finite, and for a pair of convex islands it immediately produces the result with $|S_{ij}|=1$, containing only a single constraint based on their separating line. In one example, the resulting Quadratic Program is:

$$\min_{\tau_1, \ldots, \tau_n} \sum_{i=1}^{n} \pi_i \|\tau_i\|_2^2$$

subject to: $\forall i \neq j: \forall s \in S_{ij}$: $(\tau_i i - \tau_j)$ fulfills s In some scenarios, a feasible set defined by $\{S_{ij}\}$ is empty. An example of such a scenario involves two islands and each of the two islands can fit into a hole of some other island, but both of the two islands cannot fit into the hole together. The resolution module 212 detects these scenarios by solving a feasibility problem, where each inequality of type $l_j > r_j$ is replaced by $l_j < r_j + \mu_j$, $\rho_j > -\epsilon$ with some sufficiently small positive $\epsilon$ and $\mu_1 + \mu_2 + \ldots +$ is minimized. If the Quadratic Program solver ends with $\mu_j > 0$, then the original program is not feasible. In this event, the resolution module 212 proceeds as follows:

---

FQP ← feasibility Quadratic Program based on the current set of constraints
while FQP is not feasible do
 replace all No-Fit Polygons that correspond to positive $\mu_i$ with their convex hulls,
 update the set of constraints and rebuild FQP accordingly
   end while
QP ← optimization Quadratic Program based on the current set of constraints, solve Quadratic Program

---

The above algorithm has not been observed to require more than three steps to converge on real life datasets. In a worst-case scenario, this algorithm ends with all No-Fit Polygons replaced by their corresponding convex hulls.

As a result of the previous steps, the resolution module 212 has clusters of islands. Within each cluster, the islands are packed according to the spatially coherent packing objective that minimizes distances between vertices of the islands which have a same three-dimensional coordinate without allowing the islands to overlap. The resolution module 212 then packs the clusters into a rectangular bin by treating each cluster as a single island and assuming rotations and relative transformations of each original island within a cluster are frozen. For instance, the resolution module 212 leverages the No-Fit Polygon concept to greedily place the clusters one-by-one in the quadrant x>0, y>0.

Each cluster is placed so that it does not overlap any of the already placed islands and so that the maximum of all x and y coordinates of it is minimized. In one example, the resolution module 212 places the clusters in the rectangular bin as described by Bennell et al. but modified for a rectangular bin.

This process yields a packed rectangular bin 308 according to the spatially coherent packing objective. The resolution module 212 and/or the transformation module 204 generate the packing data 214 as describing the packed rectangular bin 308. The generation module 206 receives and processes the packing data 214 to generate a three-dimensional object 310. As shown in FIG. 3, the three-dimensional object 310 is a rocking chair. The three-dimensional object 310 has an improved visual appearance relative to a rocking chair generated by conventional techniques. The generation module 206 also generates the three-dimensional object 310 in a manner that reduces spatially incoherent read and write operations relative to conventional techniques which further improves UV packing technology by reducing a number of cache misses.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-4. FIG. 5 is a flow diagram depicting a procedure 500 in an example implementation in which a three-dimensional object is generated for display in a user interface based on a three-dimensional mesh and transformations for two-dimensional islands included in a set of two-dimensional islands.

Pairs of boundary vertices of different two-dimensional islands included in a set of two-dimensional islands are identified (block 502), a first boundary vertex and a second boundary vertex of the pairs of boundary vertices both correspond to a same three-dimensional coordinate of a three-dimensional mesh. For example, the computing device 102 implements the packing module 110 to identify the pairs of boundary vertices. Transformations for two-dimensional islands included in the set of two-dimensional islands are determined based on distances between the first boundary vertex and the second boundary vertex of the pairs of boundary vertices (block 504). In some examples, the packing module 110 determines the transformations for the two-dimensional islands. A three-dimensional object is generated for display in a user interface based on the transformations and the three-dimensional mesh (block 506). In one example, the packing module 110 generates the three-dimensional object for display in the user interface.

FIG. 6 illustrates a representation 600 of a first example of automatic packing that optimizes a fill ratio compared to spatially coherent UV packing. As shown, the representation 600 includes an example 602 of automatic packing by optimizing a fill ratio and an example 604 of spatially coherent packing. The examples 602, 604 include a first three-dimensional object 606 which is a desk, a second three-dimensional object 608 which is a styracosaurus skull, and a third three-dimensional object 610 which is a rocking chair.

The three-dimensional objects 606, 608, 610 are rendered using islands packed in a rectangular bin 612 in an arrangement that only optimizes a fill ratio that minimizes an amount of unused space in the rectangular bin 612 in the example 602. After optimization, a fill ratio for the islands in the rectangular bin 612 is 80.2 percent. However, the three-dimensional objects 606, 608, 610 are rendered using islands packed in a rectangular bin 614 in spatially coherent arrangement in the example 604. For instance, a fill ratio for the islands in the rectangular bin 614 is 42.3 percent.

FIG. 7 illustrates a representation 700 of a second example of automatic packing that optimizes a fill ratio compared to spatially coherent UV packing. As illustrated, the representation 700 includes an example 702 of automatic packing by optimizing a fill ratio and an example 704 of spatially coherent packing. The examples 702, 704 include a three-dimensional object 706 which is a styracosaurus skull. The three-dimensional object 706 is rendered using islands packed in a rectangular bin 708 in an arrangement that only optimizes a fill ratio that minimizes an amount of unused space in the rectangular bin 708 in the example 702. After optimization, a fill ratio for the islands in the rectangular bin 708 is 60.8 percent. For instance, the three-dimensional object 706 is rendered using islands packed in a rectangular bin 708 in spatially coherent arrangement in the example 704. In the example 704, a fill ratio for the islands in the rectangular bin 708 is 26.0 percent.

Example System and Device

Figure 8:
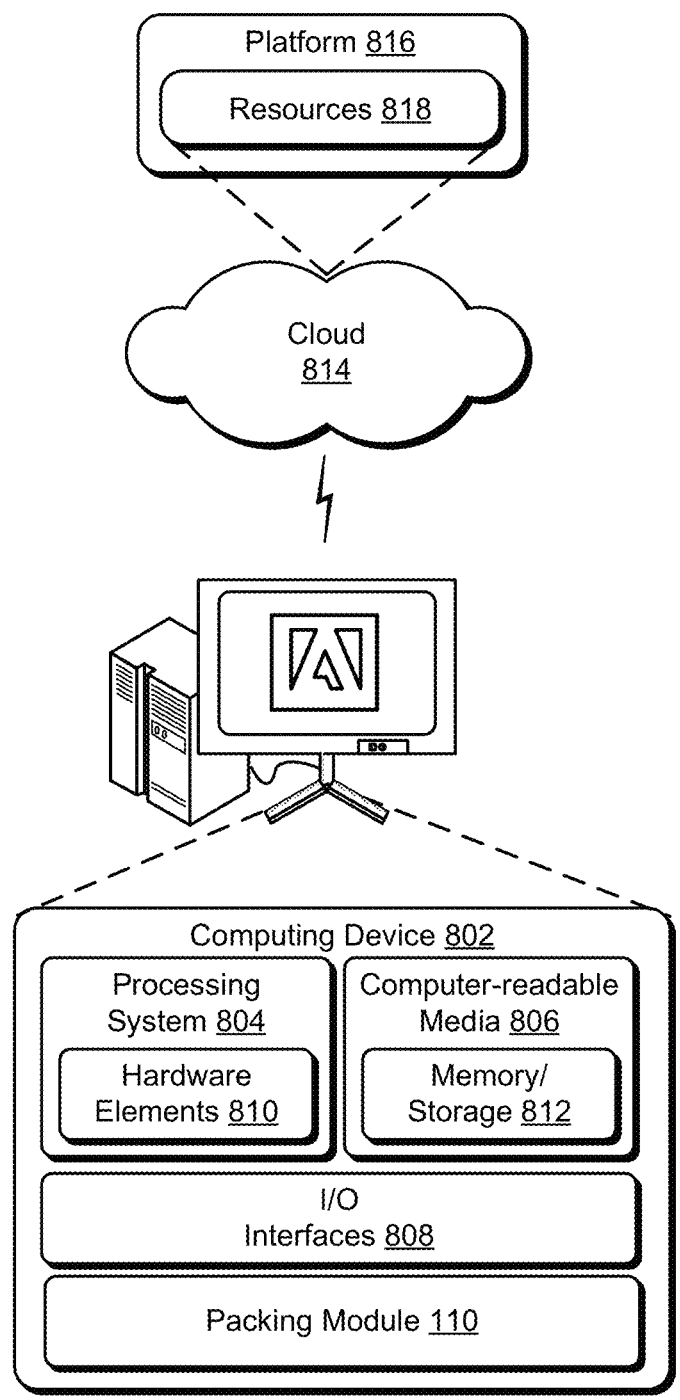
FIG. 8 illustrates an example system that includes an example computing device that is representative of one or more computing systems and/or devices for implementing the various techniques described herein.

FIG. 8 illustrates an example system 800 that includes an example computing device that is representative of one or more computing systems and/or devices that are usable to implement the various techniques described herein. This is illustrated through inclusion of the packing module 110. The computing device 802 includes, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that are configured as processors, functional blocks, and so forth. This includes example implementations in hardware as an application specific integrated circuit or other logic device formed using one or more semiconductors. The hardware elements 810 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 806 is illustrated as including memory/storage 812. The memory/storage 812 represents memory/storage capacity associated with one or more computer-readable media. In one example, the memory/storage 812 includes volatile media (such as random access memory (RAM)) and/or nonvolatile media (such as read only memory (ROM), Flash memory, optical disks, magnetic disks, and so forth). In another example, the memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 810. For example, the computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supportable by various configurations of the computing device 802 and are not limited to the specific examples of the techniques described herein. This functionality is also implementable entirely or partially through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. For example, the resources 818 include applications and/or data that are utilized while computer processing is executed on servers that are remote from the computing device 802. In some examples, the resources 818 also include services provided over the Internet and/or through a subscriber network, such as a cellular or Wi-Fi network.

The platform 816 abstracts the resources 818 and functions to connect the computing device 802 with other computing devices. In some examples, the platform 816 also serves to abstract scaling of resources to provide a corresponding level of scale to encountered demand for the resources that are implemented via the platform. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

Conclusion

Although implementations of systems for spatially coherent UV packing have been described in language specific to structural features and/or methods, it is to be understood that the appended claims are not necessarily limited to the specific features or methods described. Rather, the specific features and methods are disclosed as example implementations of systems for spatially coherent UV packing, and other equivalent features and methods are intended to be within the scope of the appended claims. Further, various different examples are described and it is to be appreciated that each described example is implementable independently or in connection with one or more other described examples.

What is claimed is:

1. A method comprising:
identifying, by a computing device, pairs of boundary vertices of different two-dimensional islands included in a set of two-dimensional islands, a first boundary vertex and a second boundary vertex of the pairs of boundary vertices both correspond to a same three-dimensional coordinate of a three-dimensional mesh;
determining, by the computing device, transformations for two-dimensional islands included in the set of two-dimensional islands that minimize distances between the first boundary vertex and the second boundary vertex of the pairs of boundary vertices; and
generating, by the computing device, a three-dimensional object for display in a user interface based on the transformations and the three-dimensional mesh.

2. The method as described in claim 1, wherein the transformations include fixed rotations.

3. The method as described in claim 2, wherein the transformations include translations determined based on the fixed rotations.

4. The method as described in claim 1, further comprising packing the two-dimensional islands into a rectangular bin based on the transformations.

5. The method as described in claim 4, wherein the transformations include initial translations that do not prevent the two-dimensional islands from overlapping within the rectangular bin.

6. The method as described in claim 1, wherein the transformations are determined for the two-dimensional islands based on distances between the first boundary vertex and the second boundary vertex of each of the pairs of boundary vertices.

7. The method as described in claim 1, wherein the distances between the first boundary vertex and the second boundary vertex of the pairs of boundary vertices are Euclidean distances.

8. The method as described in claim 1, wherein the transformations are determined using an iteratively reweighted least squares method to minimize an objective function.

9. A system comprising:
an identification module implemented by one or more processing devices to identify pairs of boundary vertices of different two-dimensional islands included in a set of two-dimensional islands, a first boundary vertex and a second boundary vertex of the pairs of boundary vertices both correspond to a same three-dimensional coordinate of a three-dimensional mesh;
a transformation module implemented by the one or more processing devices to determine transformations for two-dimensional islands included in the set of two-dimensional islands that minimize distances between the first boundary vertex and the second boundary vertex of the pairs of boundary vertices; and
a generation module implemented by the one or more processing devices to generate a three-dimensional object for display in a user interface based on the transformations and the three-dimensional mesh.

10. The system as described in claim 9, wherein the two-dimensional islands are packed into a rectangular bin based on the transformations.

11. The system as described in claim 10, wherein the transformations include initial translations that do not prevent the two-dimensional islands from overlapping within the rectangular bin.

12. The system as described in claim 10, wherein an overlapping portion of a first two-dimensional island and a second two-dimensional island is resolved based on a convex hull of the first two-dimensional island and a convex hull of the second two-dimensional island.

13. The system as described in claim 9, wherein the transformations include fixed rotations.

14. The system as described in claim 13, wherein the transformations include translations determined based on the fixed rotations.

15. A non-transitory computer-readable storage medium storing executable instructions, which when executed by a processing device, cause the processing device to perform operations comprising:
identifying pairs of boundary vertices of different two-dimensional islands included in a set of two-dimensional islands, a first boundary vertex and a second boundary vertex of the pairs of boundary vertices both correspond to a same three-dimensional coordinate of a three-dimensional mesh;
determining translations for two-dimensional islands included in the set of two-dimensional islands that minimize distances between the first boundary vertex and the second boundary vertex of the pairs of boundary vertices; and generating a three-dimensional object for display in a user interface based on the translations and the three-dimensional mesh.

16. The non-transitory computer-readable storage medium as described in claim 15, wherein the operations further comprise determining rotations for the two-dimensional islands based on an orientation of the three-dimensional mesh.

17. The non-transitory computer-readable storage medium as described in claim 16, wherein the operations further comprise packing the two-dimensional islands into a rectangular bin based on the rotations and the translations.

18. The non-transitory computer-readable storage medium as described in claim 15, wherein the distances between the first boundary vertex and the second boundary vertex of the pairs of boundary vertices are Euclidean distances.

19. The non-transitory computer-readable storage medium as described in claim 15, wherein the translations include initial translations that do not prevent the two-dimensional islands from overlapping within a rectangular bin.

20. The non-transitory computer-readable storage medium as described in claim 15, wherein the translations are determined using an iteratively reweighted least squares method to minimize an objective function.

\* \* \* \* \*